(12) United States Patent
Schubert et al.

(10) Patent No.: US 11,982,607 B2
(45) Date of Patent: May 14, 2024

(54) METHOD AND MEASURING ARRANGEMENT FOR DETERMINING A RHEOLOGICAL PROPERTY OF A FLUID

(71) Applicants: Friedrich-Alexander-Universitaet Erlangen-Nuernberg, Erlangen (DE); Julius-Maximilians-Universitaet Wuerzburg, Wuerzburg (DE)

(72) Inventors: Dirk Wolfram Schubert, Eggolsheim (DE); Paul Dalton, Eugene, OR (US); Stefan Schruefer, Erlangen (DE)

(73) Assignees: Friedrich-Alexander-Universitaet Erlangen-Nuernberg, Erlangen (DE); Julius-Maximilians-Universität Würzburg, Würzburg (DE)

( * ) Notice: Subject to any disclaimer, the term of this patent is extended or adjusted under 35 U.S.C. 154(b) by 202 days.

(21) Appl. No.: 17/560,612

(22) Filed: Dec. 23, 2021

(65) Prior Publication Data
US 2022/0196534 A1 Jun. 23, 2022

(30) Foreign Application Priority Data
Dec. 23, 2020 (DE) ............... 10 2020 216 545.9

(51) Int. Cl.
*G01N 11/04* (2006.01)
*G01N 11/08* (2006.01)
*G01N 11/00* (2006.01)

(52) U.S. Cl.
CPC ...... *G01N 11/08* (2013.01); *G01N 2011/0013* (2013.01); *G01N 2011/008* (2013.01)

(58) Field of Classification Search
CPC .. G01N 11/00; G01N 11/08; G01N 2011/008; G01N 2011/0013
See application file for complete search history.

(56) References Cited

U.S. PATENT DOCUMENTS 6,840,092 B2   1/2005 Eggen et al.
8,636,493 B2 * 1/2014 Reneker ............... G01N 11/02
                                             425/174.8 E
(Continued)

FOREIGN PATENT DOCUMENTS

CN   106442221 A    2/2017
DE      250771 A1  10/1987
(Continued)

OTHER PUBLICATIONS

Wunner Felix M. et al: "Printomics: the high-throughput analysis of printing parameters applied to melt electrowriting", Biofabrication, vol. 11, No. 2, Jan. 24, 2019 (Jan. 24, 2019), p. 025004, XP055900321 DOI: 10.1088/1758-5090/aafc41.
(Continued)

*Primary Examiner* — Alexander A Mercado
(74) *Attorney, Agent, or Firm* — Laurence A. Greenberg; Werner H. Stemer; Ralph E. Locher

(57) ABSTRACT

In order to determine a rheological property of a fluid, the fluid is conveyed with a constant volume flow rate through a nozzle and the fluid strand thereby generated is deposited on a substrate. A relative movement takes place between the nozzle and the substrate at a forward feed velocity value. A contour of the liquid strand between the nozzle and the substrate is optically measured, and an extensional viscosity as a rheological property is deduced from knowledge of the volume flow rate, the forward feed velocity value and the contour of the fluid strand.

17 Claims, 2 Drawing Sheets

(56) References Cited

U.S. PATENT DOCUMENTS

| | | | | |
|---|---|---|---|---|
| 2002/0116987 A1* | 8/2002 | Braithwaite | ............ | G01N 3/08 |
| | | | | 73/54.01 |
| 2011/0274825 A1* | 11/2011 | Reneker | ............... | D01D 5/0076 |
| | | | | 118/712 |
| 2017/0266887 A1* | 9/2017 | Roviaro | .................. | B29C 64/30 |
| 2018/0015655 A1* | 1/2018 | Gheorghescu | ........ | B29C 64/393 |
| 2019/0375149 A1* | 12/2019 | Limem | ................... | A61L 27/14 |
| 2020/0355593 A1* | 11/2020 | Smith | .................... | G01N 11/06 |

FOREIGN PATENT DOCUMENTS

| | | | | |
|---|---|---|---|---|
| DE | 60103125 T2 | 6/2005 | | |
| EP | 0013594 A1 | 7/1980 | | |
| WO | WO-03066942 A1 * | 8/2003 | ............ | D01D 4/025 |
| WO | 2012146614 A1 | 11/2012 | | |

OTHER PUBLICATIONS

Thomas M. Robinson et al: "The Next Frontier in Melt Electrospinning: Taming the Jet", Advanced Functional Materials, vol. 29, No. 44, Aug. 18, 2019 (Aug. 18, 2019), p. 1904664, XP055638182, ISSN: 1616-301X, DOI: 10.1002/adfm.201904664.

* cited by examiner

METHOD AND MEASURING ARRANGEMENT FOR DETERMINING A RHEOLOGICAL PROPERTY OF A FLUID

CROSS-REFERENCE TO RELATED APPLICATION

This application claims the priority, under 35 U.S.C. § 119, of German Patent Application DE 10 2020 216 545.9, filed Dec. 23, 2020; the prior application is herewith incorporated by reference in its entirety.

FIELD AND BACKGROUND OF THE INVENTION

The invention relates to a method and a measuring arrangement for determining rheological properties of a fluid.

Rheological properties of fluids generally influence the use and processing of such fluids to a not inconsiderable extent. A main feature is usually the so-called viscosity, which indicates how thick a fluid is. "Low-viscosity" refers to thin fluids, while an increasing (i.e. rising to higher values) viscosity ("high-viscosity") describes an increase in the "thickness" or "stickiness". While for example water, oils and the like usually exhibit so-called Newtonian rheological behavior, i.e. a linear relationship between shear rate and shear stress, or in other words have a constant viscosity as a function of the shear rate, suspensions, plastic melts or the like are usually subject to different relationships. Plastic melts normally exhibit "shear thinning" behavior, i.e. their viscosity decreases with an increasing shear rate.

Shear thinning is conventionally studied with a relatively high precision conventionally in a (plate-plate or cone-plate) rheometer. The material to be studied is introduced between two plane-parallel, usually circular plates, or in a variant between a flat plate and a conical plate, usually thermally regulated, and placed under shear stress by rotation or oscillation of one of the plates. The shear rate-dependent viscosity can be deduced from the metrologically detectable torque between the plates.

On the other hand, determination of the so-called extensional viscosity, i.e. the viscosity in an extensional flow, usually proves relatively difficult. For example, a so-called "capillary breakup extensional rheometer" ("CaBER") is used for this. In the latter, the material to be studied is introduced between two contact surfaces, which are then moved apart from one another rapidly to a predetermined distance. Primary information is in this case the time until tearing of the material bridge thereby formed. This method, however, is subject to some influences which make use and evaluation difficult.

Chinese patent application CN 106 442 221 A discloses a method in which, in order to determine rheological properties, a viscous liquid is pushed by means of a conveyor belt against a baffle plate, and the rheological properties are deduced inter alia with the aid of the way in which the liquid is squashed.

SUMMARY OF THE INVENTION

The object of the invention is to improve the determination of a rheological property of a liquid.

This object is achieved according to the invention by a method having the features of the independent method claim. This object is furthermore achieved according to the invention by a measuring arrangement having the features of the independent measuring arrangement claim. Advantageous and sometimes per se inventive embodiments and refinements of the invention are explained in more detail in the dependent claims and the following description.

The method according to the invention and the measuring arrangement according to the invention are respectively used to determine a rheological property of a fluid. The method is preferably carried out by the measuring arrangement.

According to the method, the fluid is conveyed with a constant (particularly as a function of time) volume flow rate through a nozzle. The fluid strand thereby generated (i.e. the fluid extruded from the nozzle) is deposited on a substrate. A relative movement takes place between the nozzle and the substrate at a forward feed velocity value. In other words, the nozzle and the substrate are moved relative to one another with the forward feed velocity value. A contour of the fluid strand between the nozzle and the substrate is optically measured. This contour is formed in particular as a result of the volume flow rate and the forward feed velocity and as a function of at least one rheological property of the fluid. An in particular strain rate-dependent extensional viscosity, i.e. in particular an extensional viscosity at different strain rates, of the fluid as a rheological property is then deduced from knowledge of the (in particular predetermined) volume flow rate, the (in particular predetermined) forward feed velocity value and the contour of the liquid strand. Preferably, the respective strain rate-dependent actual value of the extensional viscosity is in this case deduced. Generally speaking, the extensional viscosity is derived, i.e. in particular calculated, (preferably strain rate-dependently) from the measured contour of the fluid strand and the volume flow.

The measuring arrangement according to the invention contains a nozzle (in particular the one described above), which is used in particular to form the fluid strand. The measuring instrument furthermore comprises a conveyor apparatus, by means of which the fluid is conveyed through the nozzle (preferably with the constant volume flow rate described above) during normal operation. The measuring arrangement furthermore contains a substrate, on which the fluid strand generated by the nozzle is deposited during normal operation. The measuring arrangement furthermore contains a forward feed device for inducing—during normal operation—a relative movement between the nozzle and the substrate at a (preferably predetermined) forward feed velocity value. The measuring arrangement furthermore contains an optical detection unit for measuring the contour of the fluid strand between the nozzle and the substrate. The measuring arrangement furthermore contains a controller which is adapted to deduce the extensional viscosity as a rheological property of the fluid from knowledge of the volume flow rate, the forward feed velocity value and the contour of the liquid strand. In particular, the controller is thus adapted to carry out, in particular autonomously, the evaluation of the data detected by means of the optical detection unit. The measuring arrangement is therefore overall preferably adapted to carry out the method described in detail here and below, autonomously or in interaction with operating staff.

The method preferably uses the measuring arrangement and therefore the physical features of the measuring arrangement which are described in detail here and below. Correspondingly, vice versa the measuring arrangement likewise also contains in particular the physical features given by the description of the method. The advantages described here and below apply equally to the method and to the measuring arrangement.

As is known, a strain (for example quantified as a "strain rate") is applied to the fluid by means of the forward feed velocity. Depending on the viscosity, in particular extensional viscosity, after emerging from the nozzle this is reflected in the contour of the fluid strand, i.e. in particular the shape in which it extends from the nozzle to the substrate. Since this is optically detectable, as is known, the measuring arrangement by its fundamentally unelaborate structure, as well as the method, allow easy access to the extensional viscosity.

In principle, the measuring arrangement is also suitable for use in a commercially available 3D printer, which in this case preferably "only" needs to be expanded with the optical detection unit and optionally the controller.

In one preferred configuration, the controller is formed at least essentially by a microcontroller having a processor and a data memory, in which the functionality for carrying out the method according to the invention is implemented in terms of programming technology in the form of operating software, in particular analysis software, so that the method—optionally in interaction with operating staff—is carried out automatically (i.e. autonomously) when the operating software is run in the microcontroller. In the scope of the invention, however, the controller may also be formed by a non-programmable electronic component, for example an ASIC, in which the functionality for carrying out the method according to the invention is implemented by circuit technology means.

For example—for the case in which the measuring arrangement is formed as described above by expanding a 3D printer—the controller is that of the 3D printer, which has preferably been set up by means of the aforementioned analysis software in order to carry out or control the method.

Preferably, the forward feed device is adapted to move the nozzle relative to the in particular stationary substrate, which is configured for example in the form of a kind of tabletop on a base carrying the nozzle and the forward feed device. For example, to this end the forward feed device contains an electric motor and a downstream belt drive or spindle drive. In principle, however, it is likewise possible to arrange the nozzle stationary and to move the substrate relative to the nozzle.

In one preferred method variant, the nozzle is thermally regulated to a target temperature value. This is expedient for the case in which a plastic melt is used as the fluid. Here and in what follows, however, thermal regulation is intended to mean not only heating to a target temperature value elevated relative to room temperature, but preferably also "maintenance" at this target temperature value as far as possible. In principle, it is in fact also conceivable that, for example in the case of fluids filled with particles, heating of the fluid and the nozzle takes place because of the extrusion of the fluid from the nozzle. Such "maintenance" is expedient in order to prevent such heating—which is usually undesired, since it potentially influences the viscosity. For this reason, the measuring arrangement thus correspondingly preferably comprises a thermal regulation device assigned at least to the nozzle. For example, this thermal regulation device is configured as a liquid thermal regulation device, so that the corresponding thermal regulation fluid can also undertake a certain "cooling" function.

Furthermore, a fluid reservoir upstream of the nozzle is expediently also thermally regulated to a further target temperature value, which is preferably the same. In the latter case, the thermal regulation device described above is also adapted and provided for thermal regulation of the fluid reservoir. For example, the fluid reservoir is a container in which the fluid is stored or—particularly in the case of studying melts—melted.

Furthermore, the thermal regulation of the nozzle and in particular also of the fluid reservoir allows determination of the rheological property as a function of temperature. In this case, the method described here and below is optionally carried out repeatedly at different target temperature values.

Furthermore, the forward feed velocity, i.e. specifically the forward feed velocity value, for the relative movement between the nozzle and the substrate is preferably selected to be constant.

In another preferred method variant, a trajectory (i.e. the curve of the fluid strand between the nozzle and the point of impingement on the substrate) and a diameter of the fluid strand between the nozzle and the substrate are detected as parameters (or quantities) of the contour. For example, the trajectory is approximated by a polynomial fitted to the optically detected curve or a comparable, in particular monotonically increasing (preferably when regarding the trajectory from the substrate in the direction toward the nozzle) function, which preferably describes the curve in Cartesian coordinates. Optionally, angles (in particular trigonometric functions thereof) relative to an axis, or relative to the horizontal which is preferably placed as the x axis, are also used to describe the trajectory. In particular, the aforementioned functions may also be converted into one another. The diameter of the fluid strand (or: "strand diameter") is preferably described as a function of the position along the fluid strand, optionally in Cartesian coordinates, and in particular along a "contour coordinate" (or: "arc coordinate") of the fluid strand. The coordinate origin of this contour coordinate is expediently placed at the nozzle tip (or: the exit end of the nozzle). As an alternative, however, this coordinate origin may also be placed at the point of contact of the fluid strand with the substrate.

Preferably, a corresponding position is specified in the contour coordinate for each point of the trajectory. Furthermore, the angle of the trajectory, in particular the tangent of the trajectory, relative to the x axis, in particular relative to the horizontal, is preferably calculated and specified as a function of the contour coordinate at each point along the fluid strand.

The above-described contour is thus described in particular by the diameter and/or the trajectory. Both quantities are influenced by the extensional viscosity. Because of the forward feed velocity and the associated strain of the fluid strand, viscosity-dependent tapering of the fluid strand takes place after it emerges from the nozzle, as well as greater or lesser "sagging" of the fluid strand between the nozzle and the substrate. The contour of the fluid strand is thus described by the trajectory and the tapering, specifically the diameter (varying over the length) of the fluid strand. As is known, these quantities are optically accessible and may therefore be measured or detected relatively simply.

Optionally, the diameter of the fluid strand as well as the profile of the trajectory are detected at an (in particular predetermined) instant, for example 10 to 20 seconds after the start of the extrusion. An at least quasi-steady state may thereby be waited for, in which the entire trajectory and the profile of the diameter remain "stable" at least within negligible limits. Equally, however, continuous optical detection is likewise possible, from which the steady state may in particular in turn be derived by comparing the diameter, or the trajectory, at different instants.

The extensional viscosity (or: apparent extensional viscosity) as a function of the strain rate is in this case preferably determined with the aid of the following formula:

$$\eta_e(\dot{\varepsilon}) = \frac{\rho \cdot g}{\frac{d\alpha(s)}{ds} \cdot \frac{dv(s)}{ds}} \cdot \cos(\alpha(s)). \quad (1)$$

Here,
ρ stands for the density of the fluid,
g stands for the acceleration due to gravity,
v(s) stands for the local velocity as a function of the contour coordinate s, $$\dot{\varepsilon} = \frac{dv(s)}{ds}$$

stands for the strain rate as a function of the contour coordinate s (i.e. along the trajectory of the fluid strand), specifically in the form of the derivative of the velocity with respect to the contour coordinate s,
α(s) stands for the local angle of the trajectory relative to the horizontal as a function of the contour coordinate s, and $$\frac{d\alpha(s)}{ds}$$

stands for the 1st derivative of the angle α(s) with respect to the contour coordinate s.

The local velocity is expediently determined with the aid of the diameter of the fluid strand, which in turn for this purpose is preferably assumed to be sufficiently round locally. The following therefore applies for the (local) volume flow rate (or: "throughput") at an arbitrary position along the fluid strand:

(1)

$$Q = \pi \left(\frac{d(s)}{2}\right)^2 v(s). \quad (2)$$

Here,
d(s) stands for the diameter of the fluid strand as a function of the contour coordinate s.

The profile of the diameter of the fluid strand (and therefore similarly also the profile of the velocity) is preferably approximated ("fitted") by a function of the form:

$$d(s) = \Sigma_1^n A_i \cdot e^{-a_i \cdot s} + A_0 \quad (3).$$

Here,
$a_i$ stand for fit parameters which may be selected differently in their allowable numerical range, and
$A_i$ likewise stand for adaptable parameters.

In this case, the number n is increased stepwise in order to obtain a sufficiently good match, the fit parameters $a_i$ being selectable differently in their allowable numerical range.

Preferably, the fit parameters $a_i$ obey the following recursion formula:

$$a_{i+1} = \frac{a_i}{p}. \quad (4)$$

where p is selected in particular as an integer between 1 and 10.

Preferably, the aforementioned fit parameters $a_i$ and/or adaptable parameters $A_i$ are selected in such a way that a regression coefficient ("$R^2$") lies in a range expediently between 0.98 and 1 (i.e. in particular between 98 and 100 percent), preferably between 0.99 and 1 (i.e. in particular between 99 and 100 percent).

Since the volume flow rate is known, in particular predetermined, is preferably kept constant during an experimental run, and is constant along the fluid strand, it follows from Equation (2) that:

$$v(s) = \frac{Q}{\pi \left(\frac{d(s)}{2}\right)^2}. \quad (5)$$

Expediently, the surface tension is also taken into account for the determination of the extensional viscosity. This leads to the following formula:

$$\eta_e(\dot{\varepsilon}) = \left(\left(\frac{d\alpha(s)}{ds}\right)^{-1} \cdot \rho \cdot g \cdot \cos(\alpha(s)) - 2\gamma \cdot \frac{1}{d(s)}\right) \cdot \left(\frac{dv(s)}{ds}\right)^{-1}. \quad (6)$$

Here,
γ stands for the surface tension.

For the case of relatively very high values of the extensional viscosity, it may happen that the fluid strand has approximately a straight-line trajectory between the nozzle and the substrate. This makes the analysis described above more difficult. This effect is based on the force of gravity being too small in comparison with the viscous forces inside the fluid in order to cause sagging, i.e. in particular a non-rectilinear trajectory, of the fluid strand. In one advantageous and also per se independent inventive method variant, a further, preferably vertical force component is therefore applied to the fluid strand in addition to the force of gravity. In one optional variant, to this end an air flow directed from the nozzle onto the substrate is "blown" onto the fluid strand. Preferably, however, an electrical voltage is applied between the nozzle (or an electrode arranged for this purpose in the region of the nozzle, preferably above the latter) and the substrate. This electrical voltage, specifically the electric field thereby induced, leads to an artificial increase in the force of gravity:

$$\eta_e(\dot{\varepsilon}) = \left(\left(\frac{d\alpha(s)}{ds}\right)^{-1} \cdot \rho \cdot (g + k \cdot U) \cdot \cos(\alpha(s)) - 2\gamma \cdot \frac{1}{d(s)}\right) \cdot \left(\frac{dv(s)}{ds}\right)^{-1}. \quad (7)$$

Here,
U stands for the applied electrical voltage, and
k stands for a geometry-dependent (in particular dependent on the geometry of the electrodes for applying the voltage) constant to be calibrated.

The constant k is expediently calibrated by reference measurements on systems (i.e. in particular fluids) having a known extensional viscosity. For example, an electrical voltage is applied, the strain rate thereby induced is determined (in particular by measuring the strand diameter), and then the constant k is calculated back on the basis of the relationship known for the reference system in question between the strain rate and the extensional viscosity.

Advantageously, an electrical voltage applied as described above also makes it possible to specify (i.e. set and use) a relatively low (value) of the volume flow rate, so that a likewise reduced diameter of the fluid strand occurs. Without the additional force component, such a small volume flow rate would be prevented because of so-called Raleigh-Plateau instabilities. By applying the electrical voltage, the conditions under which the determination described here of the rheological properties may therefore be widened. Furthermore, this voltage advantageously also leads to a stabilization of the extrusion, for example by so-called stick-slip effects being preventable.

Since the strain rate likewise varies along the contour coordinate, almost arbitrarily many values of the extensional viscosity and the strain rate may be determined, in particular as a function of the selection of the volume flow rate and/or the forward feed velocity, with the aid of the optical measurement.

In one expedient method variant, the optical measurement is carried out by means of at least one camera, in particular a (commercially available) digital camera, and optionally a measuring camera. Correspondingly, the measuring arrangement contains such a (digital) camera as the optical detection unit. Preferably, the camera is aligned with its viewing direction perpendicular to the forward feed direction and in particular also perpendicular to the axis of the nozzle (i.e. the axis of the nozzle opening). The viewing direction of the camera is therefore expediently aligned perpendicularly to the plane in which the trajectory of the fluid strand is formed. The detection of the contour is preferably carried out by means of image evaluation methods. Particularly in the case of the digital camera, the measurement of the fluid strand is expediently carried out by comparison with the known dimensions of the nozzle, in particular of its "nozzle tip", which in this case form an image scale.

In one preferred embodiment of the measuring arrangement, the nozzle is aligned perpendicularly to the substrate, in particular with its axis (which thus describes the exit direction of the fluid at the nozzle). The substrate is expediently aligned horizontally during normal operation. The (nozzle) axis is therefore preferably parallel to the direction of the force of gravity during normal operation.

In one variant, the camera is arranged stationary relative to the nozzle and/or optionally the substrate. The nozzle (or optionally the substrate) thus moves past the camera. In this case, the aperture angle of the camera and its depth of field are selected in such a way that the nozzle and the fluid strand can be detected sharply over the entire movement range of the nozzle while carrying out the method.

In one alternative variant, the camera is moved synchronously with the nozzle, or optionally with the substrate. For example, the camera is coupled by means of a support to the nozzle, and in particular a structure carrying the latter. This has the advantage that the same scale is always present and the nozzle, which preferably lies in a focal plane of the camera, remains in this focal plane throughout the entire process and is thus not moved out of it.

In order to be able to determine further properties of the fluid, in one advantageous method variant spreading of the fluid strand deposited on the substrate is optically detected, optionally simultaneously with the optical detection of the trajectory and the diameter of the fluid strand. With the aid of the temporal profile of the spreading, in this variant a wettability (for example specified by a wetting angle) and/or a shear viscosity of the fluid are then in particular deduced. Preferably, to this end the measuring arrangement contains a further optical detection unit, particularly in the form of a further camera. For example, the latter is arranged with its viewing direction perpendicular to the substrate, in particular to the region in which the fluid strand is deposited.

In particular, to this end the "deposited" fluid strand, expediently its "diameter", specifically its width transversely to the forward feed direction, is optically measured. Since the spreading of the fluid strand is temporally a relatively slow process, the fluid strand is observed and therefore measured over a relatively long period of time (preferably at least 5 to about 30 seconds). The detected values are entered in the following formula:

$$a(t) = a_S - \Delta a \cdot e^{-b\frac{t}{\eta}}. \tag{8}$$

Here, a(t) stands for the diameter, or the width, of the deposited fluid strand as a function of time, $a_s$ stands for the diameter, or the width, of the deposited fluid strand in the steady (i.e. fully spread) state, b stands for a parameter to be calibrated, η stands for the (shear) viscosity, and Δa stands for a fit parameter, which may be adapted to a(t) after the calibration of b.

Preferably, the following is in this case introduced:

$$\text{i)} \quad a(t) = a_S - \Delta a \cdot e^{-\frac{t}{\tau}} \quad \text{where} \tag{9}$$

$$\frac{1}{\tau} = +\frac{4}{a_S^3}\frac{X}{\lambda\eta}A \cdot g. \tag{10}$$

Here,

X stands for the ratio of volume flow rate and forward feed velocity,

λ stands for an in particular universal constant to be determined,

−A stands for a spreading constant, which is determined by the surface tension of the substrate less the surface tension of the fluid and less the interfacial tension between the substrate and the fluid, and τ stands for a time constant which describes the temporal spreading behavior, in particular as a characteristic quantity.

Here again, the aforementioned parameters to be calibrated, or the aforementioned constant λ, are determined or calibrated in particular by means of reference measurements on a known system, preferably a fluid. For example, to this end the spreading of a fluid with the same spreading constant but a different viscosity is measured. A fluid used in this case may for example be a commercially available silicone oil. By way of example, in this regard reference is made to Härth, M., Schubert, D. W. (2012). Simple Approach for Spreading Dynamics of Polymeric Fluids. Macromolecular Chemistry and Physics, 213(6), 654-665 (sew https://dx.doi.org/10.1002/macp.201100631).

In another expedient method variant, the method described above, or at least in particular the extruding and depositing of the fluid strand, is carried out inside a thermally regulated housing. To this end, the measuring arrangement expediently contains this thermally regulated housing. Preferably, this housing encloses the nozzle and the substrate. The thermally regulated housing is intended to mean a housing having a housing interior which is thermally regulated, i.e. which can be thermally regulated to a preferably variably predeterminable temperature value during normal operation. Specifically, the measuring arrangement in this case contains the housing as well as a thermal regulation unit assigned to the latter, for example a kind of heating fan, which is adapted to heat the housing interior to the temperature value and maintain it there. Use of the thermally regulated housing has the advantage that it allows determination of the fluid property (or optionally a plurality of fluid properties) as close as possible to the processing. Specifically, in the case of 3D printing, the "printing space"—i.e. the housing interior—is sometimes likewise thermally regulated as a function of the material to be processed, in order to prevent excessively rapid cooling of the liquid strand.

In one preferred configuration, the above-described temperature value for the housing is set equal to the target temperature value for the nozzle, and in particular also that for the fluid reservoir.

In one alternative variant, the temperature value for the housing is selected to be different than the, or the respective, target temperature value of the nozzle, or of the fluid reservoir. In this way, a temperature gradient may be induced in the fluid strand and, for example, the corresponding rheological property may be determined under processing conditions, for example during a 3D printing process. When studying thermoplastic melts, in this variant the respective (target) temperature values are optionally selected according to values recommended for injection-molding processes.

In one optional method variant, the housing is flooded with a protective gas or placed at a reduced pressure, i.e. preferably evacuated (at least partially, for example in the sense of a low vacuum or fine vacuum). In this way, influences acting on the fluid and possibly damaging it, such as oxidation processes or the like, may possibly be avoided or at least reduced. To this end, the housing is preferably closable fluid-tightly and/or vacuum-tightly for normal operation, at least for a low or even fine vacuum.

In another optional method variant, artificial intelligence, for example a machine learning algorithm, a neural network or the like is used for the evaluation of the measurement data, in particular of the optically detected data. The artificial intelligence is preferably used in order to determine, in particular automatically, correlations between extensional rheological properties and the spreading behavior of the fluid.

Furthermore, the detected data and calculated data, i.e. in particular the values of the extensional viscosity, are optionally stored in a database (preferably made available online), so that they are available for subsequent processing and/or evaluation.

As an alternative to the above-described use of a 3D printer, which is expanded in particular with the camera and corresponding analysis software, in one likewise expedient embodiment the measuring arrangement is configured as a "pure" (in the sense of independent) measuring instrument.

Other features which are considered as characteristic for the invention are set forth in the appended claims.

Although the invention is illustrated and described herein as embodied in a method and a measuring arrangement for determining a rheological property of a fluid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts and quantities which correspond to one another are always provided with the same references in all the figures.

Figure 1:
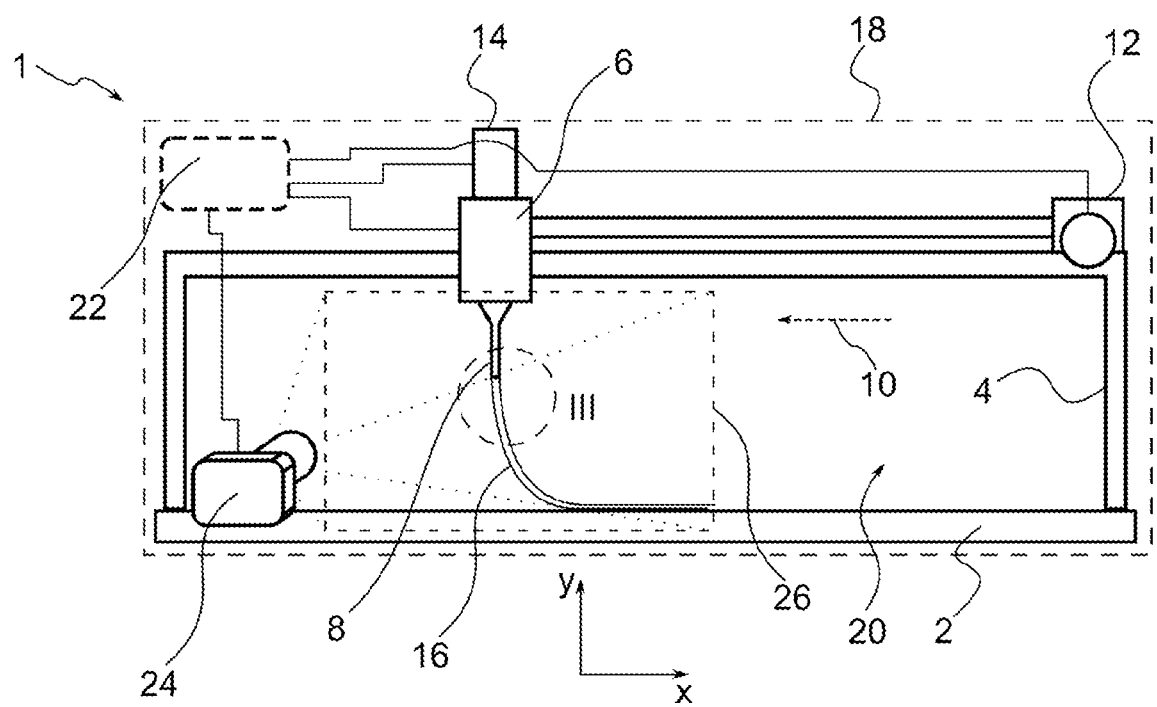
FIG. 1 is a diagrammatic, side view of a measuring arrangement for determining a rheological property of a fluid'

Referring now to the figures of the drawings in detail and first, particularly to FIG. 1 thereof, there is shown schematically a measuring arrangement, referred to below in brief as the "measuring instrument 1", which is adapted and provided to be used for determining a rheological property of a fluid. The measuring instrument 1 contains an instrument table 2, which carries a substrate (not represented in detail). The measuring instrument 1 furthermore contains a gantry-like frame 4, on which a fluid reservoir 6 and a nozzle 8 connected to the fluid reservoir 6 are mounted displaceably at least in a forward feed direction 10. In order to displace the fluid reservoir 6 and the nozzle 8, the measuring instrument 1 also has a forward feed device, here in the form of a drive 12, which has an electric motor, a downstream transmission as well as a belt drive for force transmission to the module containing the fluid reservoir 6 and the nozzle 8. The measuring instrument 1 furthermore contains a conveyor device 14, which is adapted to convey the fluid from the fluid reservoir 6 through the nozzle 8 and therefore to extrude a fluid strand 16. The substrate is used as a depositing surface for the fluid strand 16.

The conveyor device 14 is for example—in particular depending on the fluid to be studied—a pump, a piston which displaces the fluid from the fluid reservoir 6, or the like. For the case in which a plastic melt is used as the fluid, the pump is for example configured as a melt pump.

The fluid reservoir 6 and (in a manner not represented) also the nozzle 8 contain a thermal regulation device which is used to thermally regulate the fluid to a target temperature value. Optionally a common thermal regulation device is provided, by means of which the fluid reservoir 6 and the nozzle 8 are thermally regulated to the same target temperature value during normal operation. In one alternative exemplary embodiment, the fluid reservoir 6 and the nozzle 8 respectively contain mutually separate thermal regulation devices—for example electrical heating elements or fluid heating elements, in particular heating sleeves, integrated heating tubes, or the like.

The measuring instrument 1 furthermore contains a housing 18, which accommodates the instrument table 2, the frame 4 and, in the exemplary embodiment represented, also the nozzle 8, the fluid reservoir 6 and the conveyor device 14. The measuring instrument 1 furthermore contains a thermal regulation system (not represented), which is used to thermally regulate the housing interior 20 accommodated by the housing 18 to a target temperature value.

The measuring instrument 1 furthermore contains a controller 22, which is adapted to control the thermal regulation devices of the fluid reservoir 6, of the nozzle 8, the thermal regulation system for the housing 18, the drive 12 and the conveyor device 14. For example, the controller 22 is part of an (optionally industrial) PC.

In order to be able to determine the rheological property, the measuring instrument 1 furthermore contains an optical detection unit in the form of a (digital) camera 24. In the exemplary embodiment represented, the camera 24 is arranged stationary. The camera 24 is aligned with its viewing direction perpendicular to a nozzle axis and to the forward feed direction 10. The camera 24 is furthermore aligned in such a way that its optical detection region 26 includes at least the nozzle tip of the nozzle 8 and a part of the substrate lying below the nozzle 8. The extruded fluid strand 16 can therefore be detected by the camera 24 between the nozzle 8 and the substrate.

Figure 2:
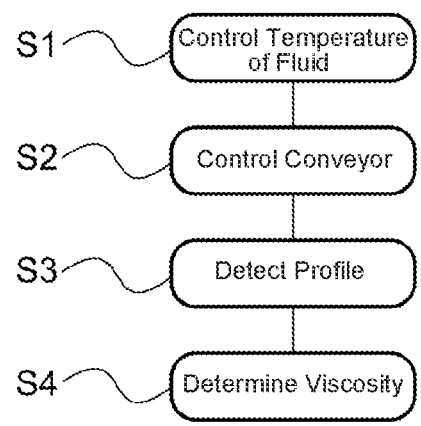
FIG. 2 is a flow chart of a method for determining the rheological property, which is carried out by means of the measuring arrangement.

The controller 22 is adapted to carry out a method described in more detail below, inter alia with the aid of FIG. 2, in order to determine the rheological property. The method is explained here by way of example for a plastic, specifically a plastic melt, as the fluid.

In a first method step S1, the controller 22 controls the thermal regulation device of the plastic-filled fluid reservoir 6 and of the nozzle 8 to a target temperature value, which lies above the melting temperature value of the plastic. The controller 22 likewise controls the thermal regulation system for the housing 18, or the housing interior 20, to a further target temperature value, which in the present variant is set equal to the target temperature value of the nozzle 8 (in the case of a polyamide, for example, at about 240 degrees Celsius).

In a second method step S2, the controller 22 controls the conveyor device 14 so that it presses the molten plastic out of the fluid reservoir 6 through the nozzle 8 with a constant volume flow rate, and thus extrudes the fluid strand 16. The controller 22 also controls the drive 12 in such a way that the fluid reservoir 6 is displaced with the nozzle 8 with a constant and predeterminable forward feed velocity value relative to the instrument table 2, and therefore the substrate. The fluid strand 16 is therefore deflected laterally after contact with the substrate and—because of a correspondingly high selection of the forward feed velocity value—drawn away from the nozzle 8. A trajectory y(x), i.e. curve, of the fluid strand 16 is therefore set up, which extends curved or bent in the forward feed direction 10 between the nozzle 8 and the substrate. The fluid strand 16 furthermore tapers with an increasing distance from the nozzle 8. The tapering is in this case dependent on the forward feed velocity, which therefore represents a kind of withdrawal velocity of the fluid strand 16 from the nozzle 8, and the viscosity, in particular the extensional viscosity. The shape of the trajectory y(x) is also dependent on these two quantities, since a relatively inviscid material (in this case i.e. a low-viscosity melt) will flow away rapidly from the nozzle 8 and therefore be bent with a relatively tight radius in the direction of the horizontal only just before the substrate.

Figure 3:
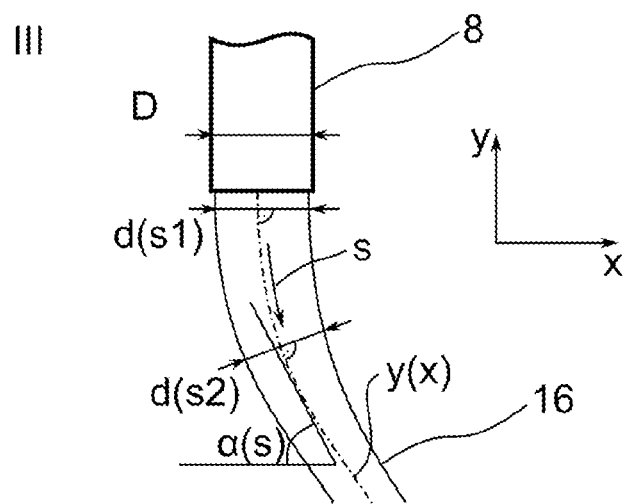
FIG. 3 is an illustration showing a detail representation III according to FIG. 1 of a nozzle of the measuring arrangement and a fluid strand extruded by means of the nozzle.

In a third method step S3, the controller 22 therefore optically detects the profile, i.e. the trajectory y(x), of the fluid strand 16 by means of the camera 24. The trajectory y(x) is optionally imaged in a Cartesian coordinate system and its profile is "fitted" by a polynomial. From this, the controller 22 derives a "contour coordinate s" by means of which all points of a "neutral fiber" (and therefore of the trajectory y(x)) of the fluid strand 16 can be described along its longitudinal extent. The controller 22 furthermore determines a diameter d(s) of the fluid strand 16 along its longitudinal extent, i.e. as a function of the contour coordinates (see for example d(s1) and d(s2) in FIG. 3). As an alternative to the above-described use of the polynomial, the controller uses a monotonically increasing (preferably when regarding the trajectory y(x) from the substrate in the direction of the nozzle) function to approximate the trajectory y(x). Optionally, trigonometric functions are also used in order to describe the trajectory y(x).

The controller 22 uses knowledge of the diameter D of the nozzle 8 in order to measure the diameter d(s) of the fluid strand. The (nozzle) diameter D therefore serves as a scale for the controller 22.

The controller 22 furthermore determines the profile of the angle α(s) between the trajectory y(x), specifically the tangent of the trajectory y(x), and the horizontal along the contour coordinate s.

Subsequently, in a fourth method step S4, the controller 22 determines the extensional viscosity of the plastic melt, i.e. its actual value, from the profile of the diameter d(s), the volume flow rate, the (known) density of the fluid, the acceleration due to gravity, the angle α(s), the shape of the trajectory y(x) and the surface tension, with the aid of the above-described Formulas (1) to (6).

Figure 4:
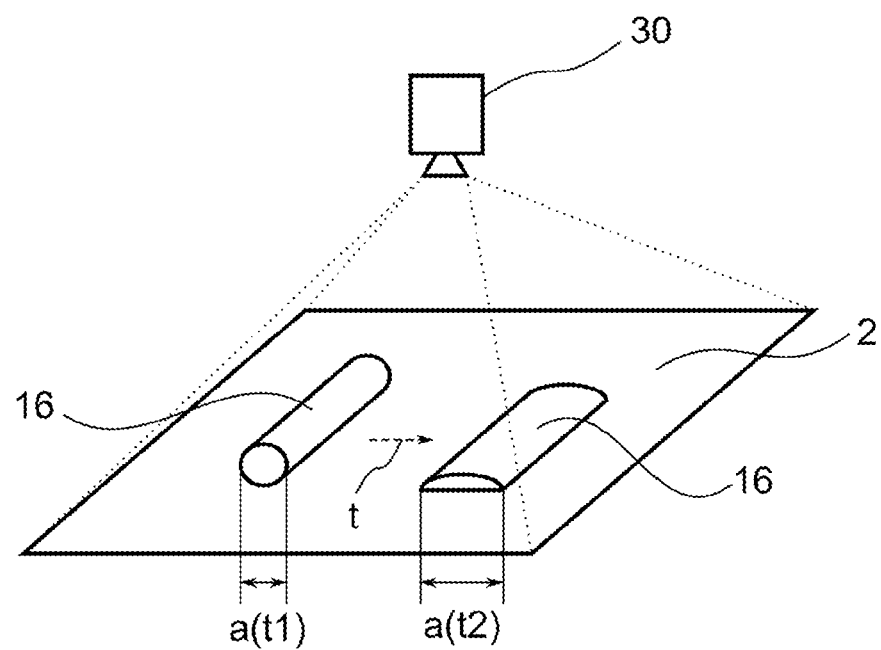
FIG. 4 is a perspective partial detail of an extension of the measuring arrangement according to another exemplary embodiment.

In one optional exemplary embodiment, which refines the exemplary embodiment described above, the measuring instrument 1 contains an additional optical detection unit, specifically a further camera 30 (see FIG. 4). This camera 30 is arranged with the viewing direction perpendicular to the instrument table 2 and therefore to the substrate. The detection region of the camera 30 is selected in such a way that the fluid strand 16 can be detected when it is deposited on the substrate. By means of the camera 30, the controller 22 detects the strand diameter a(t) of the deposited fluid strand 16 over a period of time t—schematically represented in FIG. 4 with the aid of the fluid strand 16 at two instants t1 and t2. With the aid of the aforementioned Formulas (7) to (10), the spread of the fluid strand 16 and therefore of the plastic melt on the substrate may be deduced from the temporal profile of the strand diameter a(t). This in turn gives information about the wetting behavior of the plastic melt and about its shear viscosity.

In one optional exemplary embodiment, the measuring instrument 1 is an independent instrument for studying the extensional viscosity, and optionally the shear viscosity and the wetting behavior.

In one alternative exemplary embodiment, the measuring instrument 1 is a 3D printer which is expanded with the camera 24, and optionally the camera 30, and the control instrument of which is expanded by installing a method as described above as code-containing analysis software for the controller 22.

The subject-matter of the invention is not restricted to the exemplary embodiments described above. Rather, further embodiments of the invention may be derived by the person skilled in the art from the description above. In particular, the individual features described with the aid of the various exemplary embodiments and their configuration variants may be combined with one another in a different way.

The following is a summary list of reference numerals and the corresponding structure used in the above description of the invention:

1 measuring instrument
2 instrument table
4 frame 6 fluid reservoir
8 nozzle
10 forward feed direction
12 drive
14 conveyor device
16 fluid strand
18 housing
20 housing interior
22 controller
24 digital camera
26 detection region
30 camera
S1-S4 method steps
d(s) diameter
D diameter
a(t) strand diameter of the deposited fluid strand
s contour coordinate
t period of time
y(x) trajectory
a(s) angle

The invention claimed is:

1. A method for determining a rheological property of a fluid, which comprises the steps of:
    conveying the fluid with a constant volume flow rate through a nozzle;
    depositing a fluid strand thereby generated on a substrate while causing a relative movement to take place between the nozzle and the substrate at a forward feed velocity value;
    optically measuring a contour of the fluid strand between the nozzle and the substrate; and
    calculating a strain rate-dependent extensional viscosity as the rheological property derived from the constant volume flow rate, the forward feed velocity value and the contour of the fluid strand.

2. The method according to claim 1, which further comprises thermally regulating the nozzle to a target temperature value.

3. The method according to claim 2, which further comprises thermally regulating a fluid reservoir upstream of the nozzle to a further target temperature value being a same as the target temperature value of the nozzle.

4. The method according to claim 1, which further comprises selecting the forward feed velocity value for the relative movement between the nozzle and the substrate to be constant.

5. The method according to claim 1, which further comprises detecting a trajectory and a diameter of the fluid strand between the nozzle and the substrate as parameters of the contour.

6. The method according to claim 1, which further comprises carrying out the optically measuring by means of at least one camera, which is disposed stationary relative to the nozzle.

7. The method according to claim 1, which further comprises carrying out the optically measuring by means of at least one camera, which is moved synchronously with the nozzle.

8. The method according to claim 1, which further comprises optically detecting a spreading of the fluid strand deposited on the substrate, and deducing a wettability and/or a shear viscosity of the fluid with an aid of a temporal profile of the spreading.

9. The method according to claim 1, which further comprises carrying out the depositing of the fluid strand inside a thermally regulated housing.

10. The method according to claim 1, which further comprises carrying out the depositing of the fluid strand inside a housing flooded with protective gas or at least partially evacuated.

11. The method according to claim 1, which further comprises applying an electrical voltage for generating an electric field between the nozzle and the substrate.

12. A measuring configuration for determining a rheological property of a fluid, comprising:
    a nozzle;
    a conveyor conveying the fluid through said nozzle;
    a substrate, on which a fluid strand generated by said nozzle is deposited;
    a forward feed device for inducing a relative movement between said nozzle and said substrate at a forward feed velocity value;
    an optical detector for measuring a contour of the fluid strand between said nozzle and said substrate; and
    a controller being adapted to calculate a strain rate-dependent extensional viscosity as the rheological property from knowledge of a volume flow rate, the forward feed velocity value and the contour of the fluid strand.

13. The measuring configuration according to claim 12, wherein said optical detector is formed by at least one camera.

14. The measuring configuration according to claim 12, further comprising a further optical detector being adapted and disposed to detect spreading of the fluid strand deposited on the substrate.

15. The measuring configuration according to claim 14, wherein said optical detector is disposed stationary relative to said nozzle and said substrate.

16. The measuring configuration according to claim 14, wherein said further optical detector is a further camera.

17. The measuring configuration according to claim 14, wherein said optical detector and said further optical detector are disposed stationary relative to said nozzle and said substrate.

* * * * *